(12) United States Patent
Kobayashi

(10) Patent No.: US 11,915,307 B2
(45) Date of Patent: Feb. 27, 2024

(54) SHARED VEHICLE MANAGING SYSTEM AND SHARED VEHICLE MANAGING METHOD

(71) Applicant: HONDA MOTOR CO., LTD., Tokyo (JP)

(72) Inventor: Kenichi Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 486 days.

(21) Appl. No.: 17/253,280

(22) PCT Filed: Jun. 19, 2019

(86) PCT No.: PCT/JP2019/024382
§ 371 (c)(1),
(2) Date: Dec. 17, 2020

(87) PCT Pub. No.: WO2019/244957
PCT Pub. Date: Dec. 26, 2019

(65) Prior Publication Data
US 2021/0272188 A1    Sep. 2, 2021

(30) Foreign Application Priority Data

Jun. 22, 2018  (JP) ................................ 2018-118598

(51) Int. Cl.
*G06Q 30/0645*    (2023.01)
*G01C 22/00*    (2006.01)
(Continued)

(52) U.S. Cl.
CPC ......... *G06Q 30/0645* (2013.01); *G01C 22/00* (2013.01); *G01D 21/02* (2013.01);
(Continued)

(58) Field of Classification Search
CPC .... G06Q 30/0645; G06Q 10/02; G06Q 10/20; G06Q 30/0208; G06Q 30/0226;
(Continued)

(56) References Cited

U.S. PATENT DOCUMENTS 5,911,131 A * 6/1999 Vig .................... G06Q 30/0278
705/26.1
9,373,201 B2 * 6/2016 Jefferies ............. G06Q 30/0645
(Continued)

FOREIGN PATENT DOCUMENTS

CN        105809833 A    7/2016
CN        107077133 A    8/2017
(Continued)

OTHER PUBLICATIONS

Pachon, Julian, Iakovou, Eleftherios, and Ip, Chi, "Vehicle fleet planning in the car rental industry," Journal of Revenue and Pricing Management, vol. 5, No. 3, Palgrave Macmillan Ltd., 2006, pp. 221-236.*

(Continued)

*Primary Examiner* — Nathan Erb
(74) *Attorney, Agent, or Firm* — Armstrong Teasdale LLP

(57) ABSTRACT

A shared vehicle managing system includes: a managing server configured to accept rental reservations by a plurality of users and to manage rental of shared vehicles; and a terminal configured to communicate with the managing server. The terminal includes: an information transmitting unit configured to transmit information about the shared vehicle; and a notifying unit configured to give a notification to each user who uses the shared vehicle upon reception of a prescribed maintenance signal, the notification prompting the user to perform maintenance of the shared vehicle. The managing server includes: a maintenance determining unit configured to determine whether the maintenance of the (Continued)

shared vehicle is required based on the information about the shared vehicle from the information transmitting unit; and a signal transmitting unit configured to transmit the maintenance signal to the terminal when the maintenance determining unit determines that the maintenance is required.

6 Claims, 6 Drawing Sheets

(51) Int. Cl.
    *G01D 21/02*     (2006.01)
    *G06Q 10/02*     (2012.01)
    *G06Q 10/20*     (2023.01)
    *G06Q 30/0208*     (2023.01)
    *G06Q 30/0226*     (2023.01)
    *G06Q 30/0282*     (2023.01)
    *G06Q 50/30*     (2012.01)
    *G07C 5/00*     (2006.01)

(52) U.S. Cl.
    CPC ............. *G06Q 10/02* (2013.01); *G06Q 10/20* (2013.01); *G06Q 30/0208* (2013.01); *G06Q 30/0226* (2013.01); *G06Q 30/0282* (2013.01); *G06Q 50/30* (2013.01); *G07C 5/006* (2013.01)

(58) Field of Classification Search
    CPC .... G06Q 30/0282; G06Q 50/30; G01C 22/00; G01D 21/02; G07C 5/006
    See application file for complete search history.

(56) References Cited

U.S. PATENT DOCUMENTS

| | | | |
|---|---|---|---|
| 10,360,518 | B2 | 7/2019 | Hirose et al. |
| 10,536,827 | B2 | 1/2020 | Lee et al. |
| 2008/0243549 | A1* | 10/2008 | Woronka ............... G16H 15/00 705/3 |
| 2011/0251735 | A1* | 10/2011 | Hayashi .................. B61L 27/57 701/2 |
| 2014/0207282 | A1* | 7/2014 | Angle ................. H04L 12/2809 901/1 |
| 2014/0207498 | A1 | 7/2014 | Cho |
| 2016/0110801 | A1* | 4/2016 | Steelberg ............. G06Q 50/167 705/27.1 |
| 2016/0283992 | A1* | 9/2016 | Zamer ................ G06Q 30/0625 |
| 2016/0314627 | A1* | 10/2016 | Fish ...................... G07C 5/0808 |
| 2018/0197349 | A1* | 7/2018 | Oesterling ............. G07C 5/008 |
| 2019/0304007 | A1* | 10/2019 | Parisis .................. H04W 4/029 |

FOREIGN PATENT DOCUMENTS

| | | |
|---|---|---|
| DE | 102017101508 A1 | 7/2017 |
| JP | 2004199163 A | 7/2004 |
| JP | 2006096060 A | 4/2006 |
| JP | 2014006681 A | 1/2014 |
| JP | 2014219749 A | 11/2014 |
| JP | 2015122107 A | 7/2015 |
| JP | 2015130138 A | 7/2015 |
| JP | 6132069 B2 | 5/2017 |
| KR | 20140094084 A | 7/2014 |

OTHER PUBLICATIONS

International Search Report for PCT Application PCT/JP2019/024382, dated Sep. 10, 2019; 2 pages.

Office Action for Chinese Patent Application No. 201980042035.2 dated Aug. 25, 2023; 21 pp.

\* cited by examiner

Fig.2A

How is exterior of vehicle ?

| dirty | | | | clean | complete

Fig.2B

How is exterior of vehicle ?

| dirty | | | | clean |

Have you washed vehicle during use period ?

return

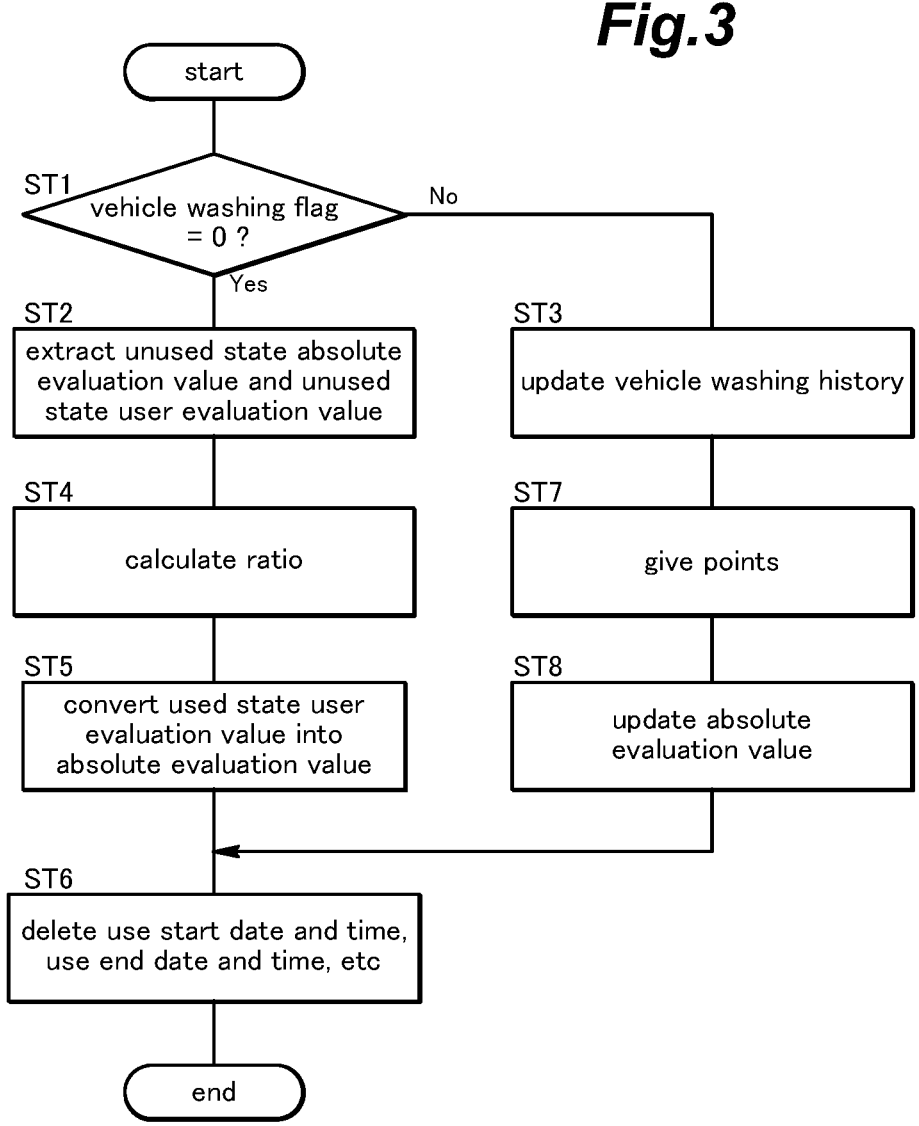

*Fig.5A*

| How is interior of vehicle ? | | | | |
|---|---|---|---|---|
| dirty | | | | clean |
| ☐ | ☐ | ☐ | ☐ | ☑ |

| How is exterior of vehicle ? | | | | |
|---|---|---|---|---|
| dirty | | | | clean |
| ☐ | ☐ | ☐ | ☑ | ☐ | complete

*Fig.5B*

| How is interior of vehicle ? | | | | |
|---|---|---|---|---|
| dirty | | | | clean |
| ☐ | ☐ | ☐ | ☐ | ☑ |

| How is exterior of vehicle ? | | | | |
|---|---|---|---|---|
| dirty | | | | clean |
| ☐ | ☐ | ☑ | ☐ | ☐ |

Have you cleaned interior during use period ? ☐
Have you washed vehicle during use period? ☐ return

SHARED VEHICLE MANAGING SYSTEM AND SHARED VEHICLE MANAGING METHOD

CROSS-REFERENCE TO RELATED APPLICATIONS

This application is a U.S. National Phase Application of PCT/JP2019/024382, filed on Jun. 19, 2019. PCT/JP2019/024382 claims the benefit of Japanese Patent Application No. 2018-118598, filed on Jun. 22, 2018. These applications are hereby expressly incorporated by reference in their entirety.

TECHNICAL FIELD

The present invention relates to a shared vehicle managing system and a shared vehicle managing method for providing a vehicle sharing service to users.

BACKGROUND ART

There is a shared vehicle managing system for pre-registered users to share a shared vehicle, namely, to perform vehicle sharing (for example, Patent Document 1). In the shared vehicle managing system according to Patent Document 1, an electric vehicle is used as the shared vehicle. The shared vehicle managing system presents a charging facility (a facility for charging vehicles) to each user so as to prompt the user to help move the shared vehicle to the charging facility upon determining that charging of the shared vehicle is required. Accordingly, an operator can reduce the cost of transporting the shared vehicle to the charging facility.

PRIOR ART DOCUMENT(S)

Patent Document(s)

Patent Document 1: Japanese Patent No. 6132069

SUMMARY OF THE INVENTION

Task to be Accomplished by the Invention

The operator of the shared vehicle managing system needs to maintain the condition of the shared vehicle by appropriately performing maintenance such as vehicle washing and interior cleaning. However, such maintenance is burdensome for the operator of the shared vehicle managing system.

In view of such a background, an object of the present invention is to reduce the burden on the operator of the shared vehicle managing system.

Means for Accomplishing the Task

To achieve such an object, one embodiment of the present invention provides a shared vehicle managing system (1) including: a managing server (6) configured to accept rental reservations by a plurality of users and to manage rental of shared vehicles (3); and a terminal (4) configured to communicate with the managing server, wherein the terminal includes: an information transmitting unit (17, 18, 71) configured to transmit information about the shared vehicle; and a notifying unit (19) configured to give a notification to each user who uses the shared vehicle upon reception of a prescribed maintenance signal, the notification prompting the user to perform maintenance of the shared vehicle, and the managing server includes: a maintenance determining unit (31) configured to determine whether the maintenance of the shared vehicle is required based on the information about the shared vehicle from the information transmitting unit; and a signal transmitting unit (32) configured to transmit the maintenance signal to the terminal when the maintenance determining unit determines that the maintenance is required.

According to this arrangement, the managing server determines whether the maintenance of the shared vehicle is required based on the transmitted information about the shared vehicle. In a case where the maintenance is required, the notification prompting the user to perform the maintenance is given. Accordingly, the frequency of the maintenance performed by the user can be increased, so that the burden on an operator can be reduced.

In the above arrangement, preferably, the information about the shared vehicle includes information corresponding to performance of the maintenance, and the managing server is configured to give an incentive to each user who has performed the maintenance upon reception of the information corresponding to the performance of the maintenance.

According to this arrangement, the incentive is given to each user who has performed the maintenance, so that the frequency of the maintenance performed by the user can be increased.

In the above arrangement, preferably, the information transmitting unit is configured to accept an input of an evaluation value by each user and to transmit the evaluation value to the managing server, the evaluation value being related to a maintenance condition of the shared vehicle each user has used, and the maintenance determining unit is configured to determine whether the maintenance is required by using the evaluation value.

According to this arrangement, the evaluation value related to the maintenance condition is transmitted from each user who uses the shared vehicle, so that it is possible to determine whether the maintenance is required without accessing the shared vehicle. Accordingly, the burden on the operator can be reduced.

In the above arrangement, preferably, the managing server includes: a converting unit (30) configured to convert the evaluation value into an absolute evaluation value for the shared vehicle; and an evaluation value storing unit (28) configured to store the absolute evaluation value, the absolute evaluation value being based on a same criterion, and the maintenance determining unit is configured to determine whether the maintenance is required based on the absolute evaluation value.

According to this arrangement, whether the maintenance is required is determined based on the absolute evaluation value, which is based on the same criterion. Accordingly, whether the maintenance is required can be determined based on a barometer having a small individual difference, so that whether the maintenance is required can be determined more accurately.

In the above arrangement, preferably, the terminal is configured to accept the evaluation value at each of a use start time and a use end time of the shared vehicle, the converting unit is configured to convert the evaluation value at the use end time into the absolute evaluation value based on the absolute evaluation value stored in the evaluation value storing unit in advance and the evaluation value at the use start time, and to update the absolute evaluation value stored in the evaluation value storing unit to the converted absolute evaluation value, and the maintenance determining unit is configured to determine whether the maintenance is required based on the updated absolute evaluation value.

According to this arrangement, it is possible to calculate the absolute evaluation value at the use end time by multiplying an evaluation value ratio (a ratio of the evaluation value at the use start time of each user to the evaluation value at the use end time of each user) by the absolute evaluation value at the use start time. Thus, it is possible to calculate the absolute evaluation value at the use end time based on a relative ratio of the evaluation value at the use start time of each user to the evaluation value at the use end time of each user. Accordingly, an influence of an individual difference on the evaluation of the maintenance condition can be reduced, so that whether the maintenance is required can be determined more accurately.

In the above arrangement, preferably, the evaluation value includes evaluation item values corresponding to a plurality of items, the absolute evaluation value includes absolute evaluation item values respectively corresponding to the evaluation item values, and the maintenance determining unit is configured to determine whether the maintenance is required for each item based on the updated absolute evaluation value.

According to this arrangement, the condition of the shared vehicle can be determined based on a plurality of absolute evaluation item values (namely, from a plurality of viewpoints), so that whether the maintenance is required can be determined more accurately.

In the above arrangement, preferably, the items include an exterior evaluation value corresponding to cleanliness of an exterior of the shared vehicle and an interior evaluation value corresponding to cleanliness of an interior of the shared vehicle.

According to this arrangement, whether the maintenance is required can be determined based on the cleanliness of the exterior of the shared vehicle and the cleanliness of the interior thereof, so that whether the maintenance is required can be determined more accurately.

In the above arrangement, preferably, the information transmitting unit is mounted on the shared vehicle and includes: a detecting unit (72) configured to detect a use condition of the shared vehicle; a recording unit (73) configured to record a detection result of the detecting unit; and a condition transmitting unit (74) configured to transmit the detected use condition to the managing server, and the maintenance determining unit is configured to determine whether the maintenance is required based on the use condition transmitted from the terminal.

According to this arrangement, the maintenance condition of the shared vehicle can be estimated based on the use condition of the shared vehicle, so that it is possible to determine whether the maintenance is required without accessing the shared vehicle. Accordingly, the burden on the operator can be reduced.

In the above arrangement, preferably, the detecting unit includes any one of an acceleration sensor (76), a rainfall sensor (77), a brightness sensor (78), an odometer (79), and a GPS (81).

According to this arrangement, the detecting unit can simply and easily acquire the information about the maintenance condition of the shared vehicle.

In the above arrangement, preferably, the detecting unit includes the rainfall sensor, and the maintenance determining unit includes a vehicle washing determining unit (90) configured to determine that each user has washed the shared vehicle based on a signal from the rainfall sensor.

According to this arrangement, the detecting unit can detect that the shared vehicle has been washed, so that the maintenance condition of the shared vehicle can be estimated more accurately.

In the above arrangement, preferably, the managing server includes a user information storing unit (27) configured to store user information including a vehicle washing history of each user, and the maintenance determining unit is configured to select a user to notify that the maintenance is required based on the user information upon determining that the maintenance of the shared vehicle is required.

According to this arrangement, the user who is expected to perform the maintenance can be selected based on the vehicle washing history, and this user can be notified that the maintenance is required. Accordingly, the notification can be given more effectively.

In the above arrangement, preferably, the managing server is configured to accept the rental reservations by the users and to request each user to input a scheduled travel route when accepting each rental reservation, and the maintenance determining unit is configured to select a user to notify that the maintenance is required based on the scheduled travel route upon determining that the maintenance of the shared vehicle is required.

According to this arrangement, the user who is expected to perform the maintenance can be selected based on the scheduled travel route, and this user can be notified that the maintenance is required. Accordingly, the notification can be given more effectively.

To achieve the above object, another embodiment of the present invention provides a shared vehicle managing method for managing an operation of a shared vehicle shared by a plurality of users, including the steps of: determining whether cleaning of the shared vehicle is required based on an operation history or declaration by a first user after the first user finishes using the shared vehicle; presenting a prescribed incentive to the first user so as to prompt the first user to clean the shared vehicle upon determining that the cleaning of the shared vehicle is required; presenting a prescribed incentive to a second user so as to prompt the second user to clean the shared vehicle in a case where the first user does not clean the shared vehicle, the second user being a next user of the shared vehicle, and allowing the second user to use the shared vehicle without prompting the second user to clean the shared vehicle in a case where the first user cleans the shared vehicle.

According to this arrangement, the notification prompting the user to do the cleaning is given in a case where the cleaning is required. Accordingly, the frequency of the cleaning performed by the user can be increased, so that the burden on the operator can be reduced.

Effect of the Invention

Thus, according to the above arrangements, it is possible to reduce the burden on the operator of the shared vehicle managing system.

BRIEF DESCRIPTION OF THE DRAWING(S)

FIG. 2A is a schematic diagram showing a screen display of an onboard terminal before a use start time in the shared vehicle managing system according to the first embodiment;

FIG. 2B is a schematic diagram showing the screen display of the onboard terminal at a use end time in the shared vehicle managing system according to the first embodiment;

FIG. 3 is a flowchart of an updating process;

FIG. 5A is a schematic diagram showing a screen display of an onboard terminal before a use start time in a shared vehicle managing system according to a second embodiment;

FIG. 5B is a schematic diagram showing the screen display of the onboard terminal at a use end time in the shared vehicle managing system according to the second embodiment.

MODE(S) FOR CARRYING OUT THE INVENTION

In the following, with reference to the drawings, embodiments of a shared vehicle managing system are described. The shared vehicle managing system is operated by a company that owns a plurality of shared vehicles, thereby providing a vehicle sharing service (car-sharing service). The vehicle sharing service in the present embodiment means a service in which applications from a plurality of pre-registered users are accepted and the shared vehicles are rented to the users who have made the applications.

The above company owns a plurality of stations where the users rent and return the shared vehicles. A user who wants to use a shared vehicle visits a station and rents the shared vehicle after making an application. After using the shared vehicle, the user visits the same station again and returns the shared vehicle. A shared vehicle identification number is allocated to each shared vehicle as a number for identifying the shared vehicle, and a station identification number is allocated to each station as a number for identifying the station. Further, a user identification number is allocated to each user as a number for identifying the user.

In such a vehicle sharing service, the condition of each shared vehicle needs to be maintained by performing vehicle washing and cleaning of a vehicle cabin (hereinafter referred to as "maintenance") in order to promote the use of the service. A degree of dirtiness of the exterior of the shared vehicle depends on the travel area, the weather, the season, and the like. A degree of dirtiness of the vehicle cabin (interior) of the shared vehicle depends on the number of users, the use time, the use status of each user, and the like.

First Embodiment

Figure 1:
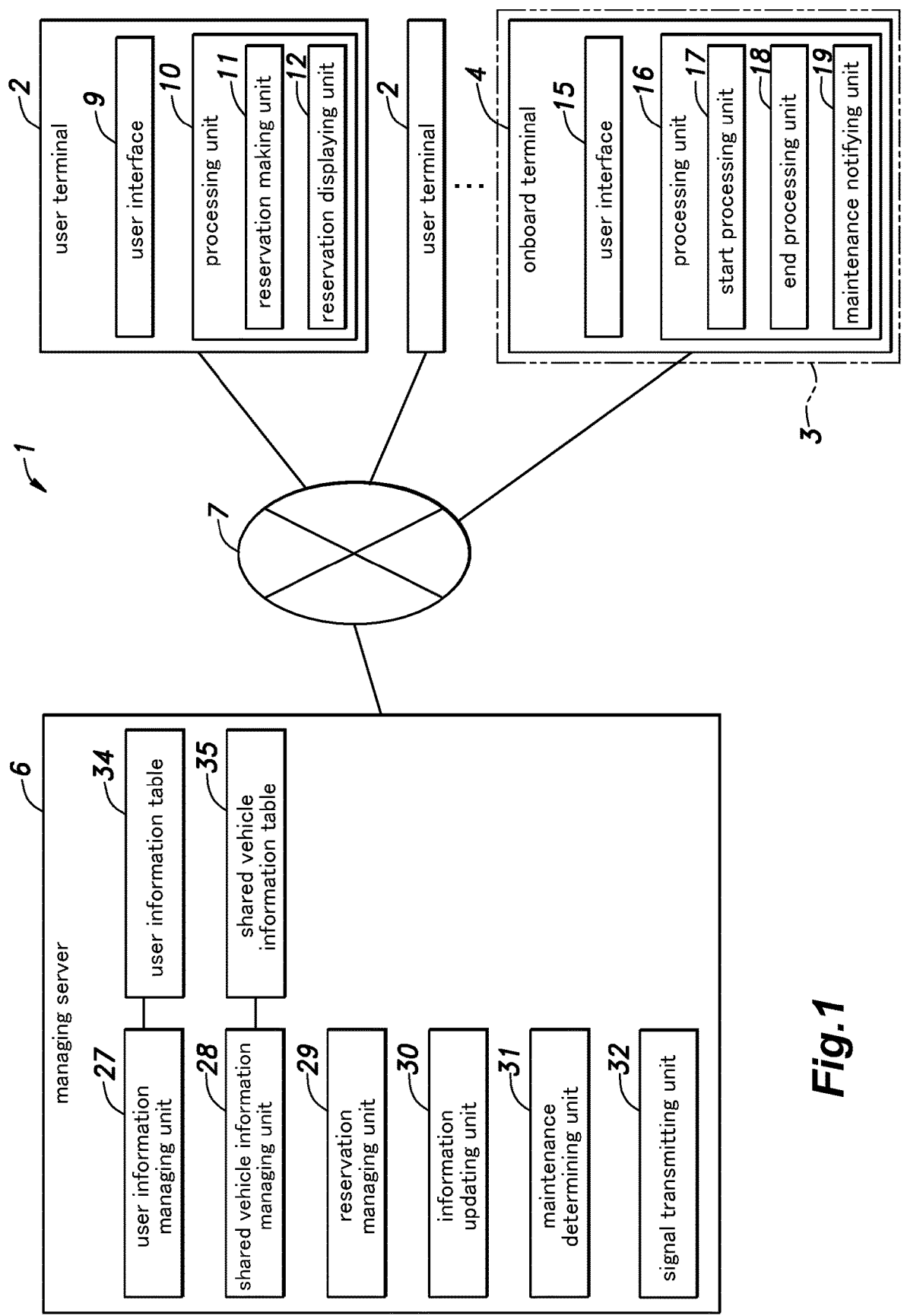
FIG. 1 is a block diagram of a shared vehicle managing system according to a first embodiment.

As shown in FIG. 1, the shared vehicle managing system 1 includes a plurality of user terminals 2, onboard terminals 4 mounted on the respective shared vehicles 3, and a managing server 6 configured to accept rental reservations by a plurality of users and to manage rental of each shared vehicle 3. Each user terminal 2 is owned by a user. The managing server 6 is provided in the building of the company that operates the shared vehicle managing system 1, and is communicably connected to each user terminal 2 and each onboard terminal 4 via a network 7. For example, the network 7 is the Internet.

Each user terminal 2 includes a user interface 9 configured to display an input screen and a message and to accept an input by each user, and a processing unit 10 configured to process an input from the user interface 9. For example, the user terminal 2 consists of a smartphone or a mobile phone. The processing unit 10 includes a reservation making unit 11 configured to transmit application information input to the user interface 9 to the managing server 6, and a reservation displaying unit 12 configured to cause the user interface 9 to display reservation information upon reception of the reservation information from the managing server 6. In the present embodiment, the reservation making unit 11 and the reservation displaying unit 12 respectively consist of software executed in the processing unit 10.

The reservation making unit 11 causes the user interface 9 to display an input field for inputting the application information when a prescribed input is made to the user interface 9. The application information includes the user identification number, the station identification number of the station where the user wants to rent the shared vehicle 3, the use start date and time, and the use end date and time. When the user completes the input of the application information, the reservation making unit 11 transmits the application information to the managing server 6.

The reservation displaying unit 12 causes the user interface 9 to display the reservation information upon reception of the reservation information from the managing server 6. The reservation information includes the station identification number of the station where the shared vehicle 3 can be rented, the shared vehicle identification number of the shared vehicle 3 to be rented, the use start date and time, and the use end date and time.

For example, each onboard terminal 4 is a vehicle navigation device (car navigation device). The onboard terminal 4 includes a user interface 15 configured to display an input screen and a message and to accept an input by the user, and a processing unit 16 including a central processing unit and a storage unit and configured to process an input from the user interface 15. The processing unit 16 includes a start processing unit 17 configured to transmit information about the shared vehicle 3 at a use start time, an end processing unit 18 configured to transmit information about the shared vehicle 3 at a use end time, and a maintenance notifying unit 19 configured to give a notification to the user when maintenance of the shared vehicle 3 is required. The start processing unit 17, the end processing unit 18, and the maintenance notifying unit 19 are respectively composed of software executed in a central processing unit, while the user interface 15 is composed of a touch panel. The start processing unit 17 and the end processing unit 18 respectively function as an information transmitting unit configured to transmit information about the shared vehicle at the use start time and the use end time.

The start processing unit 17 causes the user interface 15 to display an evaluation value input field 20 and an input completion button 21 upon reception of a prescribed signal (start signal) from the managing server 6. The evaluation value input field 20 is configured to accept an input of an evaluation value related to a maintenance condition of the shared vehicle 3. In the present embodiment, the maintenance condition represents the cleanliness of the exterior of the shared vehicle 3, and this cleanliness is represented by a five-grade evaluation value from 1 to 5. The evaluation value is set to increase as the exterior of the shared vehicle 3 becomes cleaner. As shown in FIG. 2A, the evaluation value input field 20 may be composed of checkboxes, or may be composed of dials or sliders. The start processing unit 17 transmits start time evaluation information to the managing server 6 when the input completion button 21 is pressed. The start time evaluation information includes the input evaluation value and the shared vehicle identification number of the shared vehicle 3 on which the onboard terminal 4 is mounted.

The end processing unit 18 causes the user interface 15 to display an evaluation value input field 23, a vehicle washing input field 24, and a return button 25 upon reception of a prescribed signal (end signal) from the managing server 6 (FIG. 2B). The evaluation value input field 23 is configured to accept the input of the evaluation value related to the maintenance condition of the shared vehicle 3. The vehicle washing input field 24 is configured to accept an input as to whether the user has washed the shared vehicle 3 during a use period. The evaluation value input field 23 may be similar to the evaluation value input field 20 displayed at the use start time. In the present embodiment, the vehicle washing input field 24 is composed of check boxes. The end processing unit 18 transmits end time evaluation information to the managing server 6 when the return button 25 is pressed. The end time evaluation information includes the input evaluation value, a vehicle washing flag, and the shared vehicle identification number of the shared vehicle 3 on which the onboard terminal 4 is mounted. The vehicle washing flag is set to 1 when the vehicle washing input field 24 is checked, while the vehicle washing flag is set to 0 when the vehicle washing input field 24 is unchecked.

The maintenance notifying unit 19 causes the user interface 15 to display a message prompting each user to perform maintenance (vehicle washing) of the shared vehicle 3 on which the onboard terminal 4 is mounted upon reception of a prescribed signal (hereinafter referred to as "maintenance signal") from the managing server 6.

The managing server 6 is a computer including a central processing unit, memory, a hard disk, and the like. The managing server 6 includes a user information managing unit 27 configured to hold information about each user, a shared vehicle information managing unit 28 configured to hold information about the shared vehicle 3, a reservation managing unit 29 configured to manage the reservation of the shared vehicle 3, an information updating unit 30 (converting unit) configured to convert the evaluation value received from the onboard terminal 4 and to update the information about the shared vehicle 3 held by the shared vehicle information managing unit 28, a maintenance determining unit 31 configured to determine whether the maintenance is required for each shared vehicle 3, and a signal transmitting unit 32 configured to transmit the maintenance signal to the onboard terminal 4 when the maintenance determining unit 31 determines that the maintenance is required.

The user information managing unit 27 (user information storing unit) is configured to store the information about each user as user information in a user information table 34. The user information includes the user identification number, a user name, the number of points held by the user, and a vehicle washing history. The above points may be cashable, or may be used for extending the use period of the shared vehicle 3 or purchasing goods. Further, by using the above points, the user may be able to preferentially reserve a high-grade vehicle or a vehicle in a good maintenance condition. The vehicle washing history may include information such as the number of times and length of the vehicle washing performed by the user at the use of the vehicle sharing service.

The shared vehicle information managing unit 28 (evaluation value storing unit) is configured to store the information (the shared vehicle information) about each shared vehicle 3 in a shared vehicle information table 35. The shared vehicle information includes the shared vehicle identification number, the station identification number of the station where the shared vehicle 3 is located, the user identification number (hereinafter referred to as "reservation user number") of the user who has made the reservation, the use start date and time, the use end date and time, an absolute evaluation value indicating the cleanliness of each shared vehicle 3 based on the same criterion, and the evaluation value (hereinafter referred to as "unused state user evaluation value") indicating the user's evaluation of the cleanliness at the use start time. Also, the shared vehicle information may further include a model number of the shared vehicle, the maximum number of occupants, the travel history, and the like.

The reservation managing unit 29 refers to the shared vehicle information table 35, searches for the shared vehicle that matches the application information (namely, matches the application information with the shared vehicle), and determines whether the reservation can be made upon reception of the application information. In a case where the reservation can be made, the reservation managing unit 29 respectively writes the user identification number, the use start date and time, and the use end date and time included in the application information to the shared vehicle information table 35 as the reservation user number, the use start date and time, and the use end date and time corresponding to the shared vehicle 3 that matches the application information. After that, the reservation managing unit 29 generates the reservation information and transmits the reservation information to the corresponding user terminal 2. The reservation information includes the station identification number of the station where the shared vehicle that matches the application information is located, the shared vehicle identification number of the shared vehicle 3 that matches the application information, the use start date and time, and the use end date and time. In a case where the reservation cannot be made, the reservation managing unit 29 generates the reservation information including a message indicating that the reservation cannot be made, and transmits the reservation information to the corresponding user terminal 2.

Further, the reservation managing unit 29 refers to the shared vehicle information table 35, and transmits the start signal to the onboard terminal 4 mounted on the corresponding shared vehicle 3 when the use start date and time arrives. The reservation managing unit 29 transmits the end signal to the onboard terminal 4 mounted on the corresponding shared vehicle 3 when the use end date and time arrives.

The information updating unit 30 writes the evaluation value included in a received start time evaluation signal (start time evaluation information) to the shared vehicle information table 35 as the unused state user evaluation value of the shared vehicle 3 corresponding to the shared vehicle identification number included in the start time evaluation signal upon reception of the start time evaluation signal from the onboard terminal 4.

The information updating unit 30 executes an updating process upon reception of an end time evaluation signal (end time evaluation information) from the onboard terminal 4. In the following, with reference to FIG. 3, the updating process will be described.

The information updating unit 30 executes step ST1 upon reception of the end time evaluation signal. In step ST1, the information updating unit 30 determines whether the vehicle washing flag included in the end time evaluation signal is set to 0. When the vehicle washing flag is set to 0, the information updating unit 30 executes step ST2. When the vehicle washing flag is set to 1, the information updating unit 30 executes step ST3.

In step ST2, the information updating unit 30 extracts an unused state absolute evaluation value and the unused state user evaluation value from the shared vehicle information table 35. The unused state absolute evaluation value is the absolute evaluation value corresponding to the shared vehicle identification number included in the end time evaluation signal. After the above extraction, the information updating unit 30 executes step ST4.

In step ST4, the information updating unit 30 calculates a ratio by dividing the extracted unused state absolute evaluation value by the extracted unused state user evaluation value. After that, the information updating unit 30 executes step ST5. In step ST5, the information updating unit 30 multiplies the ratio calculated in step ST4 by a used state user evaluation value, thereby converting the used state user evaluation value into a used state absolute evaluation value. The used state user evaluation value is the evaluation value at the use end time included in the end time evaluation signal. Next, the information updating unit 30 updates the absolute evaluation value in the shared vehicle information table 35 (namely, the absolute evaluation value corresponding to the shared vehicle identification number included in the end time evaluation signal) to the used state absolute evaluation value. The used state absolute evaluation value corresponds to the product of the ratio of the used state user evaluation value to the unused state user evaluation value and the unused state absolute evaluation value. After that, the information updating unit 30 executes step ST6.

In step ST6, the information updating unit 30 refers to the shared vehicle information table 35 and deletes the reservation user number of the shared vehicle 3 corresponding to the shared vehicle identification number included in the end time evaluation signal, the unused state user evaluation value, the use start date and time, and the use end date and time. Then, the information updating unit 30 ends the updating process.

In step ST3, the information updating unit 30 extracts the reservation user number from the shared vehicle information table 35 by using the shared vehicle identification number included in the end time evaluation signal, thereby acquiring the user identification number of the user who has used the shared vehicle 3. After that, the information updating unit 30 refers to the user information table 34 and updates the vehicle washing history of the user who has used the shared vehicle 3. Next, the information updating unit 30 executes step ST7. In step ST7, the information updating unit 30 adds a prescribed number of points to the number of points of the user who has used the shared vehicle 3. Accordingly, the number of points held by the user increases, and an incentive is given to the user who has washed the shared vehicle 3. After that, the information updating unit 30 executes step ST8. In step ST8, the information updating unit 30 updates the absolute evaluation value corresponding to the shared vehicle identification number included in the end time evaluation signal to the maximum value ("5" in the present embodiment) of a value the user can input as the evaluation value. When this update is completed, the information updating unit 30 executes step ST6.

Upon reception of the start time evaluation signal, the maintenance determining unit 31 refers to the absolute evaluation value corresponding to the shared vehicle identification number included in the start time evaluation signal, and executes a determining process. In the determining process, in a case where the absolute evaluation value is equal to or less than an evaluation threshold, the maintenance determining unit 31 determines that the maintenance is required. In a case where the absolute evaluation value is larger than the evaluation threshold, the maintenance determining unit 31 determines that the maintenance is not required.

The evaluation threshold is determined based on the evaluation value at which one reference person who belongs to the company determines that the maintenance of the shared vehicle 3 is required. In the present embodiment, the evaluation threshold is set to 2.

When the maintenance determining unit 31 determines that the maintenance is required, the signal transmitting unit 32 transmits the maintenance signal to the onboard terminal 4 corresponding to the shared vehicle identification number included in the start time evaluation signal.

Figure 4:
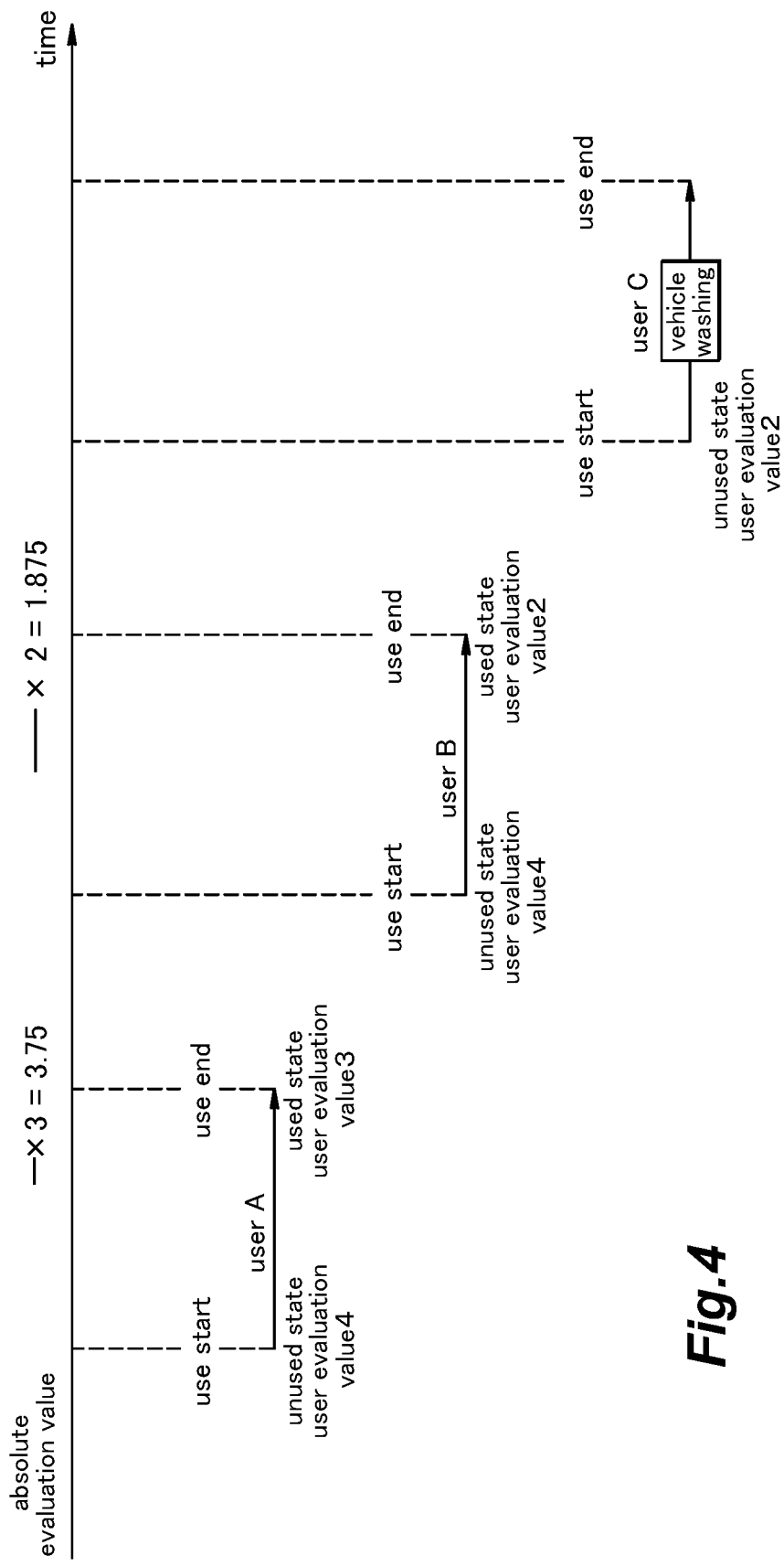
FIG. 4 is an explanatory diagram showing a change in an absolute evaluation value.

Next, with reference to FIG. 4, the operation of the shared vehicle managing system 1 will be described. A user (user A) inputs the application information by using the user terminal 2 and transmits the application information to the managing server 6. The application information includes the station where the user A wants to rent the shared vehicle 3, the use start date and time, and the use end date and time. Upon reception of the application information, the reservation managing unit 29 of the managing server 6 refers to the shared vehicle information table 35 so as to search for the shared vehicle 3 that matches the application information, updates the shared vehicle information table 35, and transmits the reservation information to the user terminal 2 in return. When the user terminal 2 receives the reservation information, the station identification number of the station where the shared vehicle 3 is to be rented, the shared vehicle identification number of the shared vehicle 3 to be rented, the use start date and time, and the use end date and time are displayed on the user interface 9.

Here, it is assumed that the shared vehicle 3 newly acquired by the company is rented for the first time as the shared vehicle 3 that matches the application information. When the rental of the shared vehicle 3 is started, the shared vehicle 3 is washed and the absolute evaluation value of the shared vehicle 3 is set to "5".

When the use start date and time arrives, the reservation managing unit 29 transmits the start signal to the onboard terminal 4 of the shared vehicle 3 to be rented. When the onboard terminal 4 receives the start signal, the evaluation value input field 20 and the input completion button 21 are displayed on the user interface 15 of the onboard terminal 4. When the user inputs the evaluation value at the use start time to the evaluation value input field 20 and presses the input completion button 21, the start time evaluation signal is transmitted to the managing server 6. Here, it is assumed that the user A inputs "4" as the evaluation value at the use start time (FIG. 2A).

Upon reception of the start time evaluation signal, the information updating unit 30 extracts the evaluation value from the start time evaluation signal, and writes the evaluation value to the shared vehicle information table 35 as the unused state user evaluation value of the shared vehicle 3 to be rented.

At the same time, the maintenance determining unit 31 receives the start time evaluation signal. Upon reception of the start time evaluation signal, the maintenance determining unit 31 executes the determining process. In the determining process, the maintenance determining unit 31 determines whether the absolute evaluation value of the shared vehicle 3 to be rented is equal to or less than the evaluation threshold. The absolute evaluation value is "5" and the evaluation threshold is "2". Accordingly, the maintenance determining unit 31 determines that the absolute evaluation value is larger than the evaluation threshold, and ends the determining process.

When the use end date and time arrives, the reservation managing unit 29 transmits the end signal to the onboard terminal 4. When the onboard terminal 4 receives the end signal, the evaluation value input field 23, the vehicle washing input field 24, and the return button 25 are displayed on the user interface 15 of the onboard terminal 4. When returning the shared vehicle 3, the user A inputs the evaluation value at the use end time to the evaluation value input field 23, checks the vehicle washing input field 24 as needed, and presses the return button 25. Accordingly, the end time evaluation signal is transmitted to the managing server 6. Here, it is assumed that the user A returns the shared vehicle 3 without washing the shared vehicle 3 during the use period. Further, it is assumed that the user A does not check the vehicle washing input field 24 and inputs "3" to the evaluation value input field 23 as the evaluation value at the use end time (FIG. 2B).

Upon reception of the end time evaluation signal, the information updating unit 30 executes the updating process. The information updating unit 30 converts the evaluation value included in the end time evaluation signal into the absolute evaluation value, and updates the absolute evaluation value in the shared vehicle information table 35 to the converted absolute evaluation value. After this update, the information updating unit 30 deletes the reservation user number of the corresponding shared vehicle 3, the unused state user evaluation value, the use start date and time, and the use end date and time. Then, the information updating unit 30 ends the updating process.

The user A transmits "4" as the evaluation value at the use start time, and transmits "3" as the evaluation value at the use end time. Accordingly, the absolute evaluation value at the use end time is 5/4×3=3.75.

A similar process is executed in a case where the same shared vehicle 3 is subsequently rented to another user B. When the use start date and time arrives, the evaluation value input field 20 and the input completion button 21 are displayed on the user interface 15 of the onboard terminal 4. When the user inputs the evaluation value and presses the input completion button 21, the start time evaluation signal is transmitted to the managing server 6. Here, it is assumed that the user B inputs "4" as the evaluation value. The information updating unit 30 updates the unused state user evaluation value of the shared vehicle 3 to "4" upon reception of the start time evaluation signal. At the same time, the maintenance determining unit 31 executes the determining process upon reception of the start time evaluation signal. The absolute evaluation value is "3.75" and the evaluation threshold is "2". Accordingly, in the determining process, the maintenance determining unit 31 determines that the absolute evaluation value is larger than the evaluation threshold, and ends the determining process.

When the use end date and time arrives, the evaluation value input field 23, the vehicle washing input field 24, and the return button 25 are displayed on the user interface 15 of the onboard terminal 4. The user B inputs the evaluation value at the use end time to the evaluation value input field 23, checks the vehicle washing input field 24 as needed, and presses the return button 25. Accordingly, the end time evaluation signal is transmitted to the managing server 6. Here, it is assumed that the user B returns the shared vehicle 3 without washing the shared vehicle 3 during the use period. Further, it is assumed that the user B does not check the vehicle washing input field 24 and inputs "2" to the evaluation value input field 23 as the evaluation value at the use end time.

Upon reception of the end time evaluation signal, the information updating unit 30 executes the updating process. "4" is transmitted as the evaluation value at the use start time, and "2" is transmitted as the evaluation value at the use end time. Accordingly, the absolute evaluation value at the use end time is 3.75/4×2=1.875. The information updating unit 30 updates the absolute evaluation value of the shared vehicle information table 35 to the absolute evaluation value "1.875" at the use end time. Then, the information updating unit 30 ends the updating process.

A similar process is executed in a case where the same shared vehicle 3 is subsequently rented to another user C. When the use start date and time arrives, the evaluation value input field 20 and the input completion button 21 are displayed on the user interface 15 of the onboard terminal 4. The user C inputs the evaluation value to the evaluation value input field 20 and presses the input completion button 21. Here, it is assumed that the user C inputs "2" as the evaluation value. Accordingly, the start time evaluation signal is transmitted to the managing server 6, and the information updating unit 30 updates the unused state user evaluation value of the shared vehicle 3 to "2". At the same time, the maintenance determining unit 31 executes the determining process. The absolute evaluation value "1.875" is smaller than the evaluation threshold "2". Accordingly, in the determining process, the maintenance determining unit 31 determines that the maintenance is required, and the signal transmitting unit 32 transmits the maintenance signal to the onboard terminal 4. When the onboard terminal 4 receives the maintenance signal, a message prompting the user C to wash the shared vehicle 3 is displayed. Here, it is assumed that the user C washes the shared vehicle 3 according to the message.

When the use end date and time arrives, the evaluation value input field 23, the vehicle washing input field 24, and the return button 25 are displayed on the user interface 15 of the onboard terminal 4. The user C inputs the evaluation value to the evaluation value input field 23, checks the vehicle washing input field 24, and presses the return button 25. Accordingly, the end time evaluation signal is transmitted to the managing server 6. Incidentally, the vehicle washing flag is set to "1" since the vehicle washing input field 24 is checked. When the managing server 6 receives the end time evaluation signal, the information updating unit 30 executes the updating process. The information updating unit 30 updates the vehicle washing history of the user C and adds a prescribed number of points to the number of points of the user C, thereby giving an incentive to the user C. Further, the information updating unit 30 updates the absolute evaluation value of the shared vehicle information table 35 to "5", and ends the updating process.

Next, the effect of the shared vehicle managing system 1 will be described. The shared vehicle managing system 1 can determine whether the maintenance of the shared vehicle 3 is required by determining whether the absolute evaluation value is equal to or less than the evaluation threshold. When the maintenance of the shared vehicle 3 is required, the message is displayed on the onboard terminal 4 and the notification prompting the user to wash the shared vehicle 3 is given. Accordingly, the frequency of the vehicle washing performed by the user can be increased, so that the burden on the operator of the shared vehicle managing system 1 can be reduced.

Further, a prescribed number of points are given to the user who has washed the shared vehicle 3. Accordingly, it is possible to give the user an incentive to wash the shared vehicle 3, so that the burden on the operator of the shared vehicle managing system 1 can be further reduced.

The managing server 6 acquires the maintenance condition of the shared vehicle 3, which is needed to determine whether the maintenance is required, based on the evaluation value transmitted from the user. Thus, the operator of the shared vehicle managing system 1 does not have to directly access the shared vehicle 3 and visually check how dirty the exterior thereof is. Accordingly, the burden on the operator of the shared vehicle managing system 1 can be reduced.

The evaluation value transmitted from the user tends to depend on an individual barometer, and thus has a large individual difference. In particular, the evaluation value itself of the user at the use start time or the use end time tends to depend on how the user assumes the maintenance condition when the evaluation value is "5" (maximum) and the maintenance condition when the evaluation value is "1" (minimum), and thus has a large individual difference. On the other hand, the ratio of the evaluation value of the user at the use start time to the evaluation value of the user at the use end time depends on the change in the maintenance condition due to the use of the shared vehicle 3, so that the individual difference thereof is smaller than that of the evaluation value itself. In the present embodiment, each time the shared vehicle 3 is rented, the information updating unit 30 updates the absolute evaluation value based on the ratio of the evaluation value of the user at the use start time to the evaluation value of the user at the use end time, and the maintenance determining unit 31 determines whether the maintenance is required based on the absolute evaluation value. Accordingly, an individual difference in the evaluation value can be reduced, so that whether the maintenance is required can be determined more accurately.

Second Embodiment

A shared vehicle managing system according to a second embodiment differs from the shared vehicle managing system according to the first embodiment in that the evaluation value includes a plurality of evaluation item values corresponding to a plurality of items and the absolute evaluation value includes a plurality of absolute evaluation item values respectively corresponding to the above items. In the present embodiment, the evaluation value includes an interior evaluation value indicating the cleanliness of the vehicle cabin and an exterior evaluation value indicating the cleanliness of the exterior of each shared vehicle 3. As shown in FIGS. 5A and 5B, at the use start time, interior evaluation value input fields 51 and 52 and exterior evaluation value input fields 53 and 54 are displayed on the user interface 15 of the onboard terminal 4. The interior evaluation value, which is an evaluation item value corresponding to the interior, is input in each of the interior evaluation value input fields 51, 52. The exterior evaluation value, which is an evaluation item value corresponding to the exterior, is input in each of the exterior evaluation value input fields 53 and 54.

The absolute evaluation value includes an interior absolute evaluation value acquired by converting the interior evaluation value based on the same criterion and an exterior absolute evaluation value acquired by converting the exterior evaluation value based on the same criterion. The interior absolute evaluation value is set to a prescribed maximum value after interior cleaning (cleaning of the interior of the shared vehicle 3). Similar to the first embodiment, each time the shared vehicle 3 is rented, the information updating unit 30 updates the interior absolute evaluation value based on the ratio of the interior evaluation values before and after the use of the shared vehicle 3 by the user. The exterior absolute evaluation value is set to a prescribed maximum value after the vehicle washing. Similar to the first embodiment, each time the shared vehicle 3 is rented, the information updating unit 30 updates the exterior absolute evaluation value based on the ratio of the exterior evaluation values before and after the use of the shared vehicle 3 by the user.

The maintenance determining unit 31 determines whether the maintenance is required for each of the interior and the exterior of the shared vehicle 3 based on the updated interior absolute evaluation value and the updated exterior absolute evaluation value. More specifically, when the interior absolute evaluation value becomes equal to or less than a prescribed interior evaluation threshold, the maintenance determining unit 31 transmits a prescribed signal (interior maintenance signal) to the onboard terminal 4. Upon reception of the interior maintenance signal, the onboard terminal 4 causes the user interface 15 to display a message indicating that the interior cleaning is required. When the exterior absolute evaluation value becomes equal to or less than a prescribed exterior evaluation threshold, the maintenance determining unit 31 transmits a prescribed signal (exterior maintenance signal) to the onboard terminal 4. Upon reception of the exterior maintenance signal, the onboard terminal 4 causes the user interface 15 to display a message indicating that the vehicle washing is required. At the use end time, a cleaning input field 55 and a vehicle washing input field 56 are displayed on the user interface 15 of the onboard terminal 4. The user checks the cleaning input field 55 in a case where the user has cleaned the interior of the shared vehicle 3, and checks the vehicle washing input field 56 in a case where the user has washed the shared vehicle 3.

In a case where the user cleans the interior of the shared vehicle 3, the user moves the shared vehicle 3 to a gas station having a contract with the company in advance, and requests the interior cleaning. After that, at the use end time, the user checks the cleaning input field 55 and presses the return button 25. Accordingly, the end time evaluation signal is transmitted from the onboard terminal 4. Similar to the first embodiment, the information updating unit 30 executes the updating process, thereby updating only the interior absolute evaluation value to "5" in step ST8.

In a case where the user washes the shared vehicle 3, the user moves the shared vehicle 3 to the gas station having the contract with the company in advance, and washed the shared vehicle 3. After that, at the use end time, the user checks the vehicle washing input field 56 and presses the return button 25. Accordingly, the end time evaluation signal is transmitted from the onboard terminal 4. Similar to the first embodiment, the information updating unit 30 executes the updating process, thereby updating only the exterior absolute evaluation value to "5" in step ST8.

Next, the effect of the shared vehicle managing system according to the second embodiment will be described. Whether the maintenance is required is determined based on two absolute evaluation item values respectively corresponding to the interior and the exterior of the shared vehicle 3. Accordingly, the condition of the shared vehicle 3 can be recognized from two viewpoints of the cleanliness of the exterior of the shared vehicle 3 and the cleanliness of the vehicle cabin, so that whether the maintenance is required can be determined more accurately.

Third Embodiment

Figure 6:
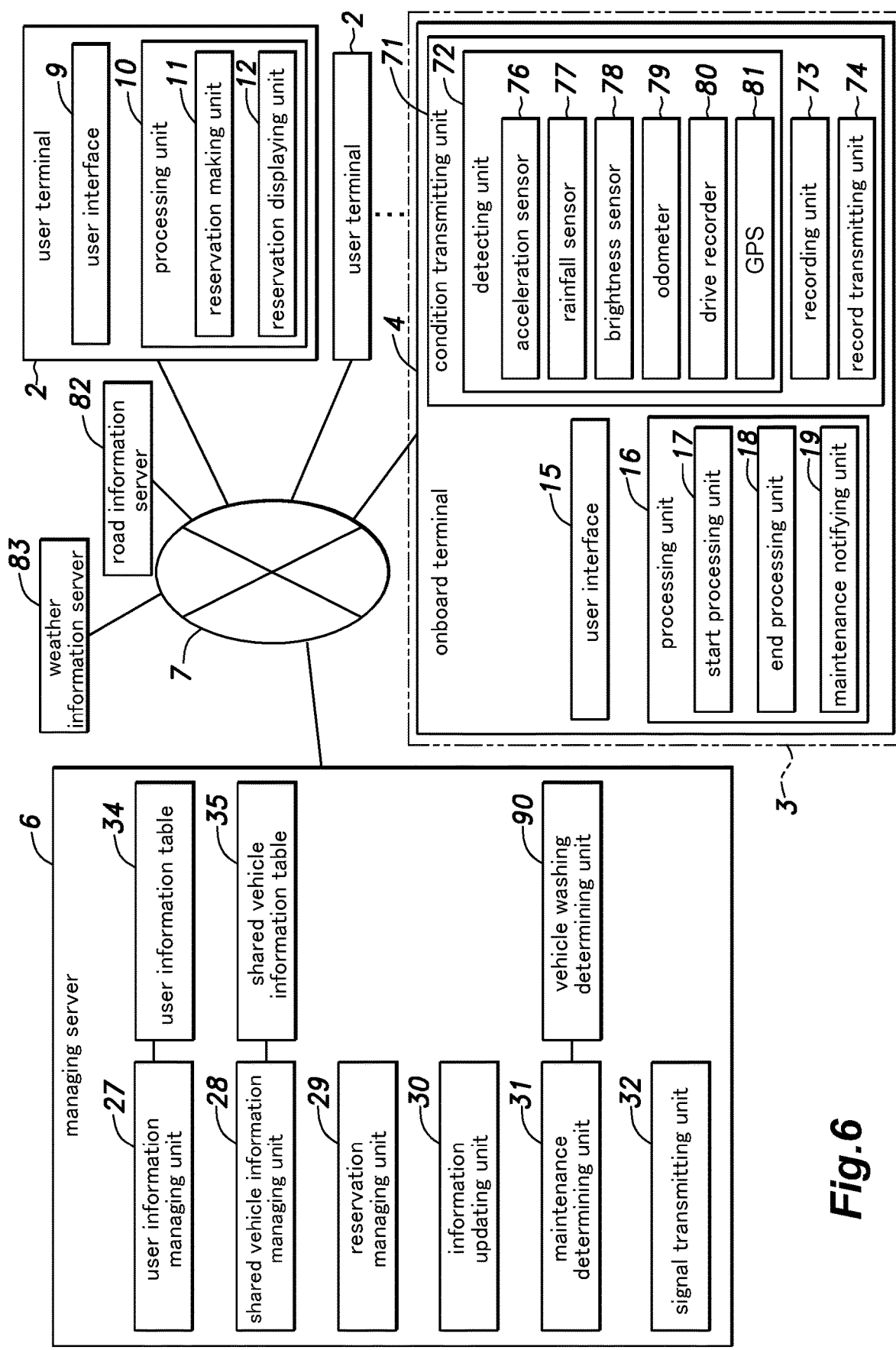
FIG. 6 is a block diagram of a shared vehicle managing system according to a third embodiment.

As shown in FIG. 6, a shared vehicle managing system according to a third embodiment differs from the shared vehicle managing systems according to the first and second embodiments in the configuration of the onboard terminal 4 mounted on each shared vehicle 3. The onboard terminal 4 according to the third embodiment includes a condition transmitting unit 71 in addition to the configuration of the onboard terminal 4 according to the first embodiment. The condition transmitting unit 71 is configured to detect a use condition of the shared vehicle 3 and to transmit the use condition to the managing server 6. The condition transmitting unit 71 includes a detecting unit 72 configured to detect the use condition of the shared vehicle 3, a recording unit 73 configured to record a detection result of the detecting unit 72 as a travel log, and a record transmitting unit 74 configured to transmit the acquired travel log to the managing server 6. The detecting unit 72 includes a known acceleration sensor 76, a rainfall sensor 77, a brightness sensor 78, an odometer 79, a drive recorder 80, and a GPS 81. Upon reception of a start signal (a signal to instruct the recording unit 73 to start recording the travel log) from the managing server 6, the recording unit 73 starts recording the travel log. Upon reception of an end signal (a signal to instruct the recording unit 73 to finish recording the travel log) from the managing server 6, the recording unit 73 instructs the record transmitting unit 74 to transmit the acquired travel log to the managing server 6. In the present embodiment, the condition transmitting unit 71 is arranged at a position different from those of the user interface 15 and the processing unit 16 in a vehicle body of the shared vehicle 3.

The managing server 6 includes the shared vehicle information managing unit 28 configured to manage the condition of the shared vehicle 3, the reservation managing unit 29 configured to accept the applications from the users and to manage the reservation information including the use start time and the use end time, the maintenance determining unit 31 configured to determine whether the maintenance is required, and the signal transmitting unit 32 configured to transmit the maintenance signal to the onboard terminal 4 of the shared vehicle 3 whose maintenance is determined to be required. The managing server 6 is connected to a road information server 82 and a weather information server 83 via the network 7. The road information server 82 is configured to acquire a traffic congestion state in real time. The weather information server 83 is configured to acquire the weather and the wind speed in each area. Each time the shared vehicle 3 is rented, the maintenance determining unit 31 holds an evaluation value (dirtiness evaluation value) about the degree of dirtiness of the shared vehicle 3 at the use end time.

When the use start date and time arrives, the reservation managing unit 29 transmits the start signal to the onboard terminal 4. Upon reception of the start signal, the onboard terminal 4 starts recording the travel log. When the use end date and time arrives, the reservation managing unit 29 transmits the end signal to the onboard terminal 4. Upon reception of the end signal, the onboard terminal 4 transmits the travel log from the use start date and time to the use end date and time to the managing server 6. The maintenance determining unit 31 executes an estimating process for estimating the dirtiness evaluation value of the shared vehicle 3 at the use end time based on the dirtiness evaluation value of the shared vehicle 3 at the previous use end time and the received travel log. After executing the estimating process, the maintenance determining unit 31 determines whether the maintenance is required based on the estimated dirtiness evaluation value. In a case where it is determined that the maintenance is required and then the use start date and time (the date and time when the shared vehicle 3 is to be rented) arrives, the signal transmitting unit 32 transmits a prescribed signal (maintenance signal) to the onboard terminal 4. Upon reception of the maintenance signal, the onboard terminal 4 causes the user interface 15 to display a message indicating that the maintenance is required.

Next, the estimating process executed by the maintenance determining unit 31 will be described. In the present embodiment, the dirtiness evaluation value is set to increase as the degree of dirtiness increases. In the estimating process, the maintenance determining unit 31 refers to the road information server 82 and the weather information server 83 based on the travel log, thereby acquiring the total travel distance of the shared vehicle 3 during a period from the use start date and time to the use end date and time, the change in the weather (weather history) during the period, the season during the period, the travel area during the period, and the like. Next, the maintenance determining unit 31 adds the sum of first to third products to the dirtiness evaluation value of the shared vehicle 3 at the previous use end time, thereby estimating the dirtiness evaluation value at the use end time. The first product is the product of a first parameter (a parameter which gets larger in a case where the weather during a travel period is rain or snow) and the travel distance corresponding to the weather. The second product is the product of a second parameter (a parameter depending on the travel area) and the travel distance in the travel area. The third product is the product of a third parameter (a parameter depending on the season) and the total travel distance. For example, the second parameter may be set to get larger in an area where the road surface is not paved. For example, the third parameter may be set to get larger in a case where the use start date and time and the use end date and time correspond to the rainy season, as compared with a case where the use start date and time and the use end date and time correspond to another season.

In the present embodiment, the maintenance determining unit 31 includes a vehicle washing determining unit 90 configured to determine that the user has washed the shared vehicle 3 based on a detection result of the rainfall sensor 77. More specifically, the maintenance determining unit 31 refers to the weather information server 83. When the rainfall sensor 77 detects a prescribed rainfall, the maintenance determining unit 31 determines whether the rainfall is due to rain or the vehicle washing. In a case where the rainfall is not due to rain, the maintenance determining unit 31 may determine that the shared vehicle 3 has been washed, and reset the dirtiness evaluation value (for example, set the dirtiness evaluation value to zero).

Next, the effect of the shared vehicle managing system according to the third embodiment will be described. The use condition, which includes the travel history and the travel environment of the shared vehicle 3 and the like, is detected by the detecting unit 72 mounted on the shared vehicle 3. The use condition is transmitted from the record transmitting unit 74 to the managing server 6, and the maintenance determining unit 31 can estimate the maintenance condition of the shared vehicle 3 based on the received use condition. Thus, the operator can determine whether the maintenance is required without directly visiting the place where the shared vehicle 3 is located or the station where the shared vehicle 3 is returned. Accordingly, the burden on the operator can be reduced.

Further, the detecting unit 72, which is configured to acquire the use condition of the shared vehicle 3, is composed of the acceleration sensor 76, the rainfall sensor 77, the brightness sensor 78, the odometer 79, the drive recorder 80, and the GPS 81. Accordingly, the information about the use condition of the shared vehicle 3 can be acquired simply and easily. In the present embodiment, the detecting unit 72 includes all of the acceleration sensor 76, the rainfall sensor 77, the brightness sensor 78, the odometer 79, the drive recorder 80, and the GPS 81, but the detecting unit 72 may include at least one of these elements.

Fourth Embodiment

A shared vehicle managing system according to a fourth embodiment differs from the shared vehicle managing system according to the first embodiment in that the application information includes a scheduled travel route of the user. When the shared vehicle 3 is reserved, the user terminal 2 causes the user interface 9 to display an input field for the scheduled travel route, thereby requesting the user to input the scheduled travel route. Similar to the first embodiment, the shared vehicle information includes the shared vehicle identification number, the station identification number, the reservation user number, the use start date and time, the use end date and time, the absolute evaluation value, and the unused state user evaluation value. Also, the shared vehicle information includes the scheduled travel route. The reservation managing unit 29 is configured to store the received scheduled travel route in the user information table 34.

Upon determining that the maintenance of the shared vehicle 3 is required, the maintenance determining unit 31 refers to the user information table 34, thereby acquiring the scheduled travel route of the shared vehicle 3. In a case where there is a place (for example, the gas station having the contract with the company in advance) where the shared vehicle 3 can be washed on the scheduled travel route, the maintenance determining unit 31 transmits the maintenance signal to the onboard terminal 4. In a case where there is no place where the shared vehicle 3 can be washed on the scheduled travel route, the maintenance determining unit 31 does not transmit the maintenance signal to the onboard terminal 4.

Next, the effect of the shared vehicle managing system with the above configuration will be described. The maintenance determining unit 31 can select a user whose travel route has the place where the shared vehicle 3 can be washed, and give the notification prompting this user to wash the shared vehicle 3. Accordingly, the shared vehicle managing system can select a user with a possibility of washing the shared vehicle 3, thereby more efficiently giving the notification prompting the user to wash the shared vehicle 3.

Fifth Embodiment

A shared vehicle managing system according to a fifth embodiment differs from the shared vehicle managing system according to the first embodiment in the operation of the maintenance determining unit 31. Upon determining that the maintenance of the shared vehicle 3 is required, the maintenance determining unit 31 refers to the user information table 34, thereby acquiring the vehicle washing history of the user who uses the shared vehicle 3. Next, the maintenance determining unit 31 calculates a vehicle washing probability of the user based on the vehicle washing history. In a case where the vehicle washing probability of the user is higher than a prescribed threshold (hereinafter referred to as "vehicle washing determination threshold"), the maintenance determining unit 31 transmits the maintenance signal to the onboard terminal 4. In a case where the vehicle washing probability of the user is lower than the vehicle washing determination threshold, the maintenance determining unit 31 does not transmit the maintenance signal to the onboard terminal 4.

The vehicle washing probability of the user may be calculated so as to get higher in proportion to the number of times of the vehicle washing by the user. Further, the vehicle washing probability of the user may be calculated not only based on the number of times of the vehicle washing by the user but also based on the chance of rain on the user's travel route acquired from the weather information server 83 and at least one of the user's use start date and time and use end date and time. At this time, the vehicle washing probability of the user may be calculated so as to increase as the maximum value of the chance of rain on the travel route decreases. Further, the vehicle washing probability of the user may be calculated so as to be the lowest when the user's use start date and time (or the user's use end date and time) is present between 0 a.m. and 6 a.m. or 6 p.m. and 0 a.m., the next lowest when the user's use start date and time is present between 6 a.m. and 0 p.m., and the highest when the user's use start date and time is present between 0 p.m. and 6 p.m.

Next, the effect of the shared vehicle managing system with the above configuration will be described. The shared vehicle managing system selects the user who is expected to wash the shared vehicle 3 based on the vehicle washing history, at least one of the user's use start date and time and use end date and time, and the weather during the use period, and notifies the user that the vehicle washing is required, thereby prompting the user to wash the shared vehicle 3. Accordingly, the notification that the vehicle washing is required can be given more effectively.

Concrete embodiments of the present invention have been described in the foregoing, but the present invention should not be limited by the foregoing embodiments and various modifications and alterations are possible. In the first embodiment described above, the unused state user evaluation value and the used state user evaluation value transmitted from the user are used to calculate the absolute evaluation value. On the other hand, the managing server 6 may store a ratio (coefficient) of the absolute evaluation value to the unused state user evaluation value for each user in the user information table 34, acquire an evaluation tendency of each user, and estimate the absolute evaluation value. Further, in the second embodiment, the managing server 6 may store a ratio (coefficient for each item) of the evaluation value for each item transmitted from each user to the absolute evaluation value for each item before a use start time of each user. When a new user is registered, the managing server 6 may estimate the coefficient for each item based on attributes such as the user's age, gender, and driving characteristics. Then, the managing server 6 may convert the evaluation value transmitted from the user based on the estimated coefficient, thereby estimating the absolute evaluation value. Further, when the managing server 6 converts the evaluation value transmitted from the user into the absolute evaluation value, the converted value may be equal to or less than a prescribed value. In such a case, the managing server 6 may determine whether the maintenance is required not based on the converted value but based on another evaluation value.

In the shared vehicle managing system 1 according to the first embodiment, the user makes an input as to whether the user has washed the shared vehicle 3 at the use end time. On the other hand, as in the third embodiment, the onboard terminal 4 may include the rainfall sensor 77, and the maintenance determining unit 31 may include the vehicle washing determining unit 90 configured to determine whether the user has washed the shared vehicle 3 based on the detection result of the rainfall sensor 77.

In the fifth embodiment, in a case where at least one of the user's use start date and time and use end date and time is present within an expected period (namely, a period during which the percentage of the users, who actually wash the shared vehicle 3 after being notified that the vehicle washing is required, is expected to decrease), the vehicle washing determination threshold may be lowered so as to transmit the maintenance signal to more onboard terminals 4. In this way, by increasing the onboard terminals 4 that receive the maintenance signal, it is possible to prevent the total number of users who wash the shared vehicles 3 from decreasing. The above expected period may include at least one of summer (from July to September) and winter (from November to February).

As described in the above embodiments, in the shared vehicle managing system 1, the maintenance determining unit 31 executes a step of determining whether the cleaning (maintenance) of the shared vehicle 3 is required based on declaration (first embodiment) by a first user or an operation history (fifth embodiment) of the shared vehicle 3 (namely, information about the shared vehicle 3). After that, when the cleaning of the shared vehicle 3 is required, the maintenance notifying unit 19 executes a step of notifying the first user that the cleaning for which an incentive is given is required. After that, in a case where the first user does not clean the shared vehicle 3, the maintenance determining unit 31 again determines that the cleaning of the shared vehicle 3 is required, and the maintenance notifying unit 19 executes a step of prompting a second user, who is a next user of the shared vehicle 3, to cleaning the shared vehicle 3. Namely, a shared vehicle managing method for managing an operation of a shared vehicle shared by a plurality of users includes the steps of: determining whether cleaning of the shared vehicle is required based on an operation history or declaration by a first user after the first user finishes using the shared vehicle; presenting a prescribed incentive to the first user so as to prompt the first user to clean the shared vehicle upon determining that the cleaning of the shared vehicle is required; presenting a prescribed incentive to a second user so as to prompt the second user to clean the shared vehicle in a case where the first user does not clean the shared vehicle, the second user being a next user of the shared vehicle, and allowing the second user to use the shared vehicle without prompting the second user to clean the shared vehicle in a case where the first user cleans the shared vehicle. Accordingly, the frequency of the cleaning performed by the user can be increased, so that the burden on the operator can be reduced.

In the above embodiment, the notification prompting the user to clean the shared vehicle 3 is given, but the present invention is not limited to this embodiment. For example, a shared vehicle managing system may include; a managing server configured to accept rental reservations by a plurality of users and to manage rental of shared vehicles; and a terminal (onboard terminal) configured to communicate with the managing server. The terminal may be mounted on the shared vehicle and connected to an onboard notifying unit (a horn unit, a light, or the like) configured to emit a sound and/or light so as to give a notification to an outside of the shared vehicle. The terminal may include: an information transmitting unit configured to transmit information about the shared vehicle; and a notifying unit configured to drive the onboard notifying unit so as to give the notification to the outside of the shared vehicle upon reception of a prescribed maintenance signal. The managing server may include: a maintenance determining unit configured to determine whether the maintenance of the shared vehicle is required based on the information about the shared vehicle from the information transmitting unit; and a signal transmitting unit configured to transmit the maintenance signal to the terminal when the maintenance determining unit determines that the maintenance is required.

Alternatively, a shared vehicle managing system may include; a managing server configured to accept rental reservations by a plurality of users and to manage rental of shared vehicles; a terminal (onboard terminal) configured to communicate with the managing server; and a power equipment configured to clean the shared vehicle based on a signal from the terminal. The terminal may include: an information transmitting unit configured to transmit information about the shared vehicle; and a power equipment control unit configured to drive the power equipment so as to clean the shared vehicle upon reception of a prescribed maintenance signal. The managing server may include: a maintenance determining unit configured to determine whether the maintenance of the shared vehicle is required based on the information about the shared vehicle from the information transmitting unit; and a signal transmitting unit configured to transmit the maintenance signal to the terminal when the maintenance determining unit determines that the maintenance is required.

GLOSSARY OF TERMS

1: shared vehicle managing system
3: shared vehicle
4: onboard terminal
6: managing server
17: start processing unit (information transmitting unit)
18: end processing unit (information transmitting unit)
19: maintenance notifying unit (notifying unit)
27: user information managing unit (user information storing unit)
28: shared vehicle information managing unit (evaluation value storing unit)
30: information updating unit (converting unit)
31: maintenance determining unit
32: signal transmitting unit
71: condition transmitting unit (information transmitting unit)
72: detecting unit
73: recording unit
76: acceleration sensor
77: rainfall sensor
78: brightness sensor
79: odometer
81: GPS
90: vehicle washing determining unit

The invention claimed is:

1. A shared vehicle managing system, comprising:
a managing server configured to accept rental reservations by a plurality of users and to manage rental of shared vehicles; and
a terminal configured to communicate with the managing server, wherein the terminal includes: an information transmitting unit configured to accept an input of an evaluation value by each user and to transmit the evaluation value to the managing server, the evaluation value being related to a maintenance condition of a shared vehicle each user has used; a notifying unit configured to give a notification to each user who uses the shared vehicle upon reception of a prescribed maintenance signal, the notification prompting the user to perform maintenance of the shared vehicle; and a rainfall sensor mounted on the shared vehicle, the managing server includes: a converting unit configured to convert the evaluation value into an absolute evaluation value for the shared vehicle; an evaluation value storing unit configured to store the absolute evaluation value, the absolute evaluation value being based on a same criterion; a maintenance determining unit configured to determine whether the maintenance of the shared vehicle is required; and a signal transmitting unit configured to transmit the maintenance signal to the terminal when the maintenance determining unit determines that the maintenance is required, the terminal is configured to accept the evaluation value at each of a use start time and a use end time of the shared vehicle, the converting unit is configured to convert the evaluation value at the use end time into the absolute evaluation value based on the absolute evaluation value stored in the evaluation value storing unit in advance and the evaluation value at the use start time, and to update the absolute evaluation value stored in the evaluation value storing unit to the converted absolute evaluation value, the maintenance determining unit is configured to determine whether the maintenance is required based on the updated absolute evaluation value, and the maintenance determining unit updates the absolute evaluation value to a value indicating that the maintenance is not required when the maintenance determining unit judges that the shared vehicle is washed based on a signal from the rainfall sensor.

2. The shared vehicle managing system according to claim 1, wherein the evaluation value includes evaluation item values corresponding to a plurality of items, the absolute evaluation value includes absolute evaluation item values respectively corresponding to the evaluation item values, and the maintenance determining unit is configured to determine whether the maintenance is required for each item based on the updated absolute evaluation value.

3. The shared vehicle managing system according to claim 2, wherein the items include an exterior evaluation value corresponding to cleanliness of an exterior of the shared vehicle and an interior evaluation value corresponding to cleanliness of an interior of the shared vehicle.

4. The shared vehicle managing system according to claim 1, wherein the managing server includes a user information storing unit configured to store user information including a vehicle washing history of each user, and the maintenance determining unit is configured to select a user to notify that the maintenance is required based on the user information upon determining that the maintenance of the shared vehicle is required.

5. The shared vehicle managing system according to claim 1, wherein the managing server is configured to accept the rental reservations by the users and to request each user to input a scheduled travel route when accepting each rental reservation, and the maintenance determining unit is configured to select a user to notify that the maintenance is required based on the scheduled travel route upon determining that the maintenance of the shared vehicle is required.

6. The shared vehicle managing system according to claim 1, wherein the terminal includes a user interface including a touch panel configured to display an input screen and a message and to accept an input by a user, and the input screen includes evaluation value input fields, and the evaluation value input fields included in the input screen and displayed at the use start time are the same as those included in the input screen and displayed at the use end time.

* * * * *